(12) United States Patent
Wang et al.

(10) Patent No.: US 10,074,103 B2
(45) Date of Patent: Sep. 11, 2018

(54) METHOD AND SYSTEM FOR IDENTIFYING MOBILE DEVICE ACCORDING TO INFORMATION FEATURE OF APPLICATIONS OF MOBILE DEVICE

(71) Applicant: INSTITUTE FOR INFORMATION INDUSTRY, Taipei (TW)

(72) Inventors: Hao-Cheng Wang, New Taipei (TW); Jing-Wei Wang, Taipei (TW); Sheng-Chang Chen, Taipei (TW); Rong-Sheng Wang, Taipei (TW); Shih-Chun Chou, Taipei (TW)

(73) Assignee: Institute For Information Industry, Taipei (TW)

( * ) Notice: Subject to any disclaimer, the term of this patent is extended or adjusted under 35 U.S.C. 154(b) by 935 days.

(21) Appl. No.: 14/559,739

(22) Filed: Dec. 3, 2014

(65) Prior Publication Data

US 2016/0140606 A1     May 19, 2016

(30) Foreign Application Priority Data

Nov. 17, 2014   (TW) .............................. 103139741 A

(51) Int. Cl.
G06Q 30/02         (2012.01)
(52) U.S. Cl.
CPC ..... G06Q 30/0246 (2013.01); G06Q 30/0267 (2013.01)
(58) Field of Classification Search
CPC .................................................... G06Q 30/02
See application file for complete search history.

(56) References Cited

U.S. PATENT DOCUMENTS

| 5,745,190 A | * | 4/1998 | Ioka ....................... H04N 5/144 348/700 |
| 2003/0095723 A1 | * | 5/2003 | Ishizaka ................ G06T 3/4007 382/298 |
| 2013/0080782 A1 | * | 3/2013 | Rajadurai ............. H04L 63/065 713/171 |
| 2013/0124309 A1 | * | 5/2013 | Traasdahl ............... H04L 67/22 705/14.49 |
| 2013/0124331 A1 | * | 5/2013 | Doughty ............ G06Q 30/0269 705/14.66 |
| 2013/0262675 A1 | | 10/2013 | Tiger et al. |
| 2014/0258367 A1 | | 9/2014 | Suryavanshi et al. |

OTHER PUBLICATIONS

Taiwan Patent Office, Office action dated Jan. 29, 2016.

* cited by examiner

*Primary Examiner* — Vincent M Cao

(57) ABSTRACT

The present disclosure provides a method and a system for identifying mobile device according to information feature of applications of the mobile device. In an analysis device, obtaining a first information feature related to a first application and a second information feature related to a second application, wherein the first information feature is corresponding to one of the mobile devices, the second information feature is corresponding to one of the mobile devices. The analysis device compares the degree of similarity between the first information feature and the second information feature, and a comparison result determines whether the corresponding mobile device with the first information feature and the corresponding mobile device with the second information feature are the same mobile device. Thus, the method and the system can identify whether or not certain applications are already installed to the same mobile device.

16 Claims, 6 Drawing Sheets

METHOD AND SYSTEM FOR IDENTIFYING MOBILE DEVICE ACCORDING TO INFORMATION FEATURE OF APPLICATIONS OF MOBILE DEVICE

BACKGROUND OF THE INVENTION

Field of the Invention

The instant disclosure relates to method and system for identifying mobile devices; in particular, to a method and a system for identifying mobile devices based on information features of applications of mobile devices.

Description of Related Art

Smartphones and tablets are the most prevalently used daily necessities among all mobile devices, and the applications installed in the mobile devices provide various kinds of information based on the individual needs of each user. In order provide better service, application operators can collect the conditions of using applications via the tracking program within the applications. Analytical results based on user behavior can be applied to advertising effectiveness tracking or user preferences analysis.

In advertising services, advertising effectiveness can be calculated based on the number of hits, the amount of exposure or visits of the application (or the advertisement in the application). By analyzing the advertising effectiveness, sales personnel or advertising industry can help prepare budget allocation or proposed marketing strategies. However, one mobile device may have installed multiple applications thereon. If an advertisement is exposed in different applications within the same mobile device, the advertising effectiveness will only be applied to the same user, which could provide inaccurate advertising effectiveness analysis.

Typically, each conventional mobile device has an international mobile station equipment identity (IMEI), an media assess control (MAC) address, or similarly unique identification code while each application has an unique identification code such as unique device identifier (UDID) in order to identify mobile devices and mobile device users, so that advertisements will not be double counted in different applications within the same mobile device. However, since user privacy has always been and becoming even more important, the unique identification information is gradually prohibited from access, thus, making the ability to identify whether different applications are installed onto the same mobile device according to its unique identification information difficult. A new identification method is necessary to identify whether multiple applications are installed on the same mobile device.

To address the above issues, the inventor strives via associated experience and research to present the instant disclosure, which can effectively improve the limitation described above.

SUMMARY OF THE INVENTION

The objective of the instant disclosure is to provide a method and a system for identifying mobile devices according to information features of the applications, which can identify whether different applications are installed on the same mobile device.

In accordance with the embodiments, the instant disclosure provides a method for identifying mobile devices according to information features of each application of the each mobile device, which includes the following steps: connect an analysis device with a plurality of mobile devices via a network, in which the analysis device has a features database. The features database stores a first information feature with the identifying information from the corresponding mobile device and a second information feature with the identifying information of the corresponding mobile device. Then, obtain the first information feature related to a first application and the second information feature related to a second application by the analysis device, in which the first information feature corresponds to one of the mobile devices, the second information feature corresponds to one of the mobile devices. Then, compare the degree of similarity between the first information feature and the second information feature by the analysis device and generating a first comparison result. Moreover, determine whether the mobile device corresponding to the first information feature and the mobile device corresponding to the second information feature are the same mobile device by the analysis device according to the first comparison result, and replacing the identifying information of the mobile device corresponding to the second information feature stored in the features database with the identifying information of the mobile device corresponding to the first information feature if the mobile device corresponding to the first information feature and the mobile device corresponding to second information feature are determined to be the same mobile device.

In accordance with the embodiments, the instant disclosure provides a system for identifying mobile devices according to information features of each application of the each mobile device, the system includes: an analysis device connected to a plurality of mobile devices via the network. The analysis device includes a receiving unit, a features database, and a processing unit. The receiving unit obtains a first information feature related to a first application and a second information feature related to a second application. The first information feature corresponds to one of the mobile devices, the second information feature corresponds to one of the mobile devices. The features database stores the first information feature with an identifying information from the corresponding mobile device and the second information feature with an identifying information of the corresponding mobile device. The processing unit compares the degree of similarity between the first information feature and the second information feature, generates a first comparison result, and determines whether the mobile device with the corresponding first information feature and the mobile device with the corresponding second information feature are the same mobile device according to the first comparison result, and replaces the identifying information of the mobile device corresponding to the second information feature stored in the features database with the identifying information of the mobile device corresponding to the first information feature if the mobile device with the corresponding first information feature and the mobile device with the corresponding second information feature are determined to be the same mobile device.

In summary, the instant disclosure provides a method and a system that identifies mobile devices according to information features of applications and by analyzing the information features associated to applications, accurately identifies whether various application are already installed on the same mobile device under the circumstances where user information is not acquirable.

In order to further understand the instant disclosure, the following embodiments and illustrations are provided. However, the detailed description and drawings are merely

DETAILED DESCRIPTION OF THE PREFERRED EMBODIMENTS

The aforementioned illustrations and detailed descriptions are exemplarity for the purpose of further explaining the scope of the instant disclosure. Other objectives and advantages related to the instant disclosure will be illustrated in the subsequent descriptions and appended drawings.

Figure 1:
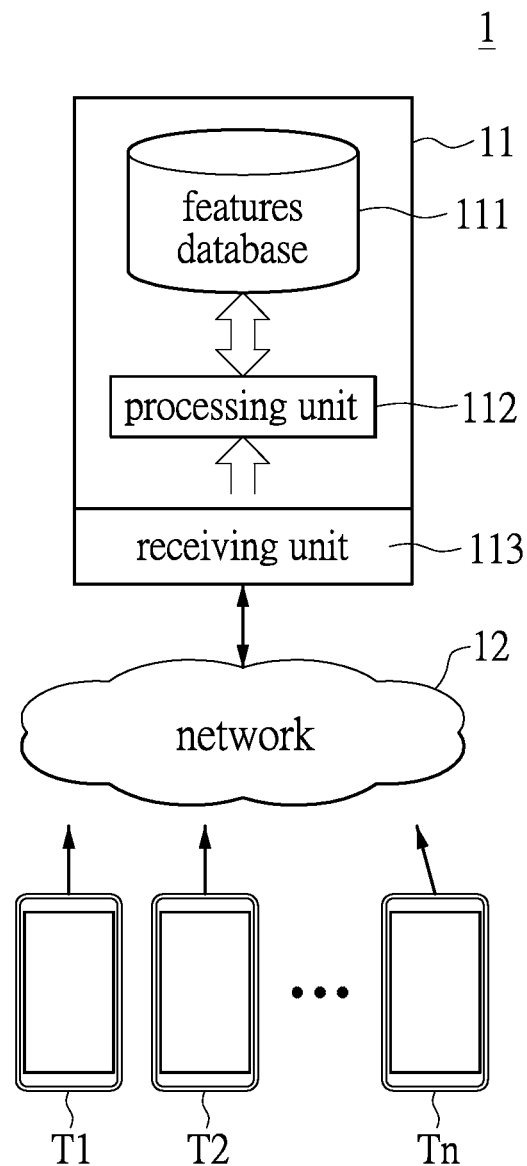
FIG. 1 is a schematic diagram of a system identifying mobile devices based on information feature in an application in accordance with an embodiment of the instant disclosure.

Please refer to FIG. 1 as a schematic diagram of a system identifying mobile devices based on information feature in an application in accordance with an embodiment of the instant disclosure. The system identifying mobile devices based on information feature in an application includes an analysis device 11. The analysis device 11 connects to a plurality of mobile devices T1, T2 . . . TN via a network 12. The analysis device 11 includes a receiving unit 113, a feature database 111, and a processing unit 112. The receiving unit 113 can be a network interface, the processing unit 112 can be a central processing unit, and the feature database 111 can be a hard disk or other types of data storage devices or equipment. FIG. 1 shows the analysis device 11 as a functional block, however, the analysis device 11 can be a single server or a distributed server (linked via wired or wireless communication) and the analysis device 11 is not limited to be installed on the same hardware. The analysis device 11 can also operate via cloud computing type of network technology to achieve cloud hosting. Mobile devices T1, T2 . . . TN can be smart phones or tablets. The analysis device 11 and applications on the mobile devices T1, T2 . . . TN can established a (network) connection, in which the connection settings can be built-in to the application, such that the receiving unit 113 can obtain all information feature relative to applications in the mobile devices T1, T2 . . . TN via the network.

Figure 2:
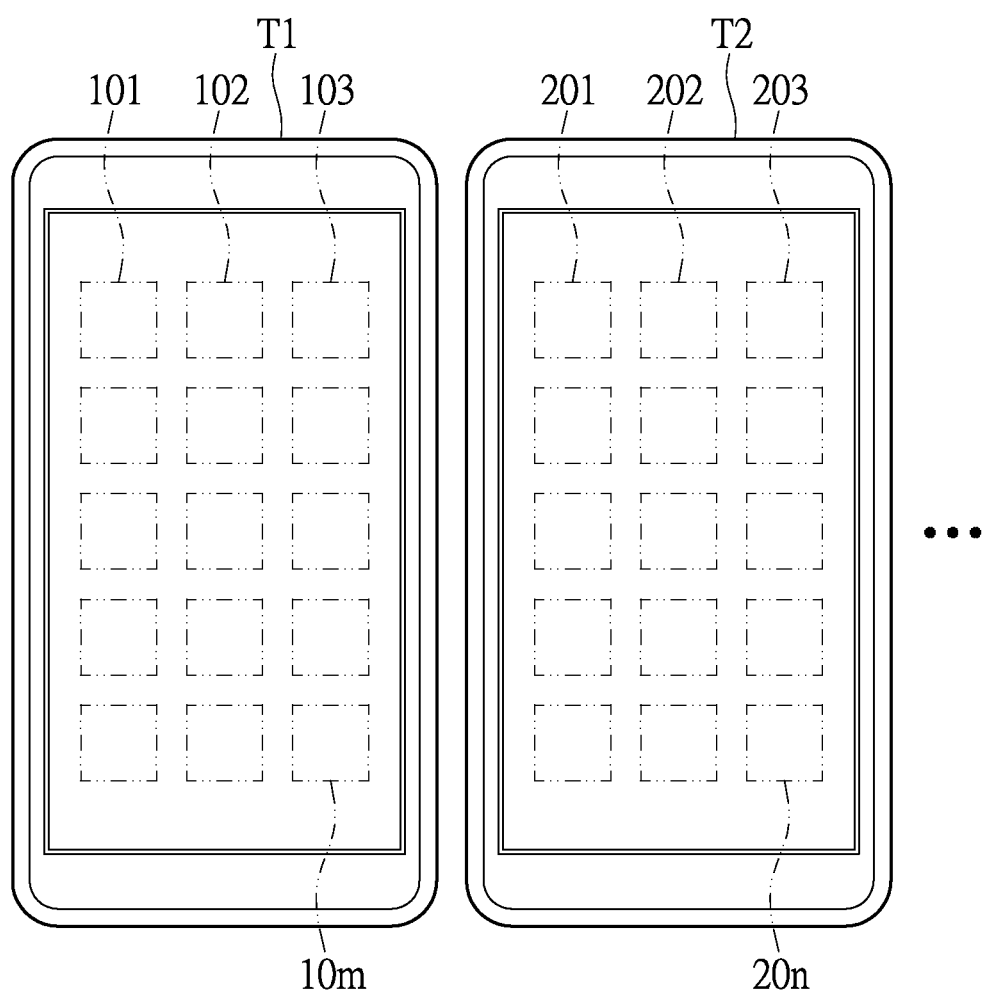
FIG. 2 is a schematic diagram of the application of a mobile device in accordance with an embodiment of the instant disclosure.
Figure 3:
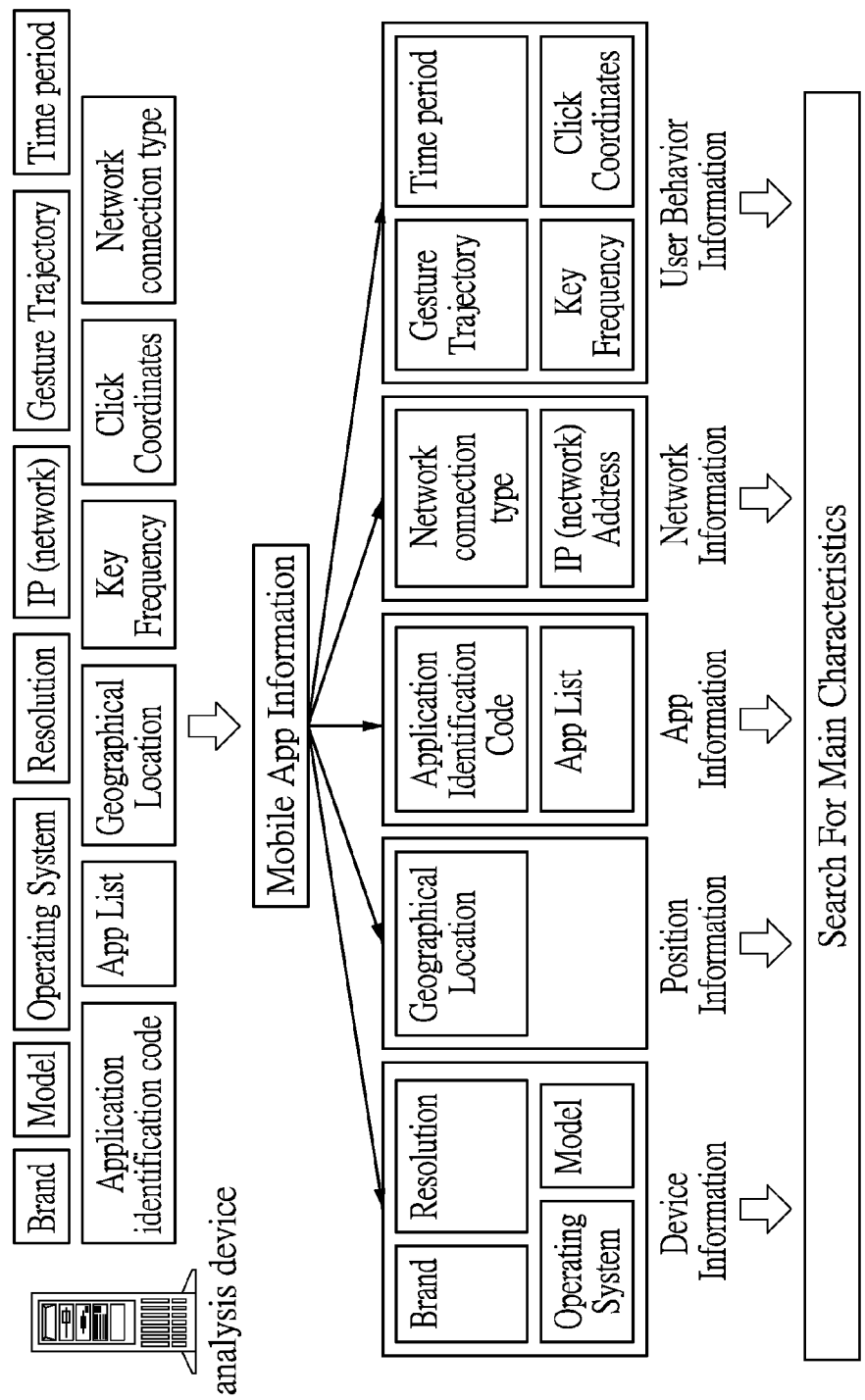
FIG. 3 is a schematic diagram illustrating categorization of the mobile application information in accordance with an embodiment of the instant disclosure.

Please refer to FIGS. 1 and 2. FIG. 2 is a schematic diagram of the application of a mobile device in accordance with an embodiment of the instant disclosure. As shown, the mobile device T1 has installed applications 101, 102, 103 . . . 10m, whereas mobile device T2 has installed applications, 201, 202, 203 . . . 20n. Before the analysis device 11 makes comparison and identification related tasks, the associated information feature will first be sent to the analysis device 11, and the analysis device 11 at this point in time still cannot determine which applications belong to the same mobile device. The information feature of the associated applications of each mobile device T1, and T2 . . . TN will be compared in the analysis device 11. In the instant embodiment, a first application 101 is compared with a second application 102, 103 . . . 10m, 201, 202, 203 . . . 20n. The comparisons between any two information features in applications of the mobile devices can be made under the same principle as above. As shown in FIG. 2, mobile devices T1 and T2 are used as examples. The receiving unit 113 obtains the first information feature that corresponds to the mobile device T1 and associates with the first application 101, and the second information feature that corresponds to the mobile device T2 and associates with the second application 102, 103 . . . 10m, 201, 202, 203 . . . 20n via the network 12. The information features are obtained according to mobile application information of the application and the installation application in the mobile device. Further details regarding the categories and contents of mobile application information are disclosed later in the instant disclosure. The first application 101 or the second application 102, 103 . . . 10m, 201, 202, 203 . . . 20n as shown in FIG. 2 are used to demonstrate two different applications. The two applications can be different applications installed in the same mobile device, for example the second application 102, 103 . . . 10m, or the same application on different mobile device, for example the second application 201, 202 . . . 20n. In other words, the analysis device 11 can receive all information feature of the application in the mobile device T1, T2 . . . TN via the network 12. The application of the mobile devices or the analysis device 11 can first determine the required mobile application information to be the information feature according to the current system design (or defined by the system administrator). Alternatively, the application on the mobile device can actively collect and process the mobile application information to obtain the necessary information feature, or the analysis device 11 can process the mobile application information to obtain the necessary information feature. Network 12 such as the internet, LAN network, or WIFI, but is not limited to the examples provided herein. Disclosure related to how the analysis device 11 obtains information feature is provided later in the instant disclosure along with the process flow in FIG. 4. In FIG. 2, the analysis device 11 needs to compare the information feature of the first application 101 with the information feature of the second application 102, 103 . . . 10m, 201, 202, 203 . . . 20n in order to determine whether applications in the first application 101 and second applications 102, 103 . . . 10m, 201, 202, 203 . . . 20n are installed in the same mobile device.

Features database 111 stores the first information feature and the corresponding identification information of the mobile device, as well as the second information feature and the corresponding identification information of the mobile device. The mobile device with the corresponding first information feature and the mobile device with the corresponding second information feature can be the same mobile device or different mobile devices. Please refer to FIG. 2 as an example, where the first information feature is related to the first application 101 and the mobile device T1, and the second information is feature related to the second application 102, 103 . . . 10m, 201, 202, 203 . . . 20n and the mobile device T2. In the feature database 111, each application is related to an information feature and identification information of a mobile device. For example, the first application 101 is related to the first information feature I101 and the identification information M101 of the mobile device, the second application 102 is related to the second information feature I102 and the identification information M102 of the mobile device, the second application 103 is related to the second information feature I103 and the identification information M103 of the mobile device . . . the second application 201 is related to the second information feature I201 and the identification information M201 of the mobile device . . . the second application 20n is related to the second information feature I20n and the identification information M0n of the mobile device. Notably, the labeling (102, 103 . . . 10m, 201, 202, 203 . . . 20n) of the applications as aforementioned in the instant embodiment is only for the ease of explanation while the labeling of the applications in the features database 111 is not necessarily required to be in the stated sequences. Each application communicates with the features database 111 by providing each application a number for identification, however, the sequence and association between each application are not limited by the numbering and examples provided above. The first application 101 and the second application 102 for example although similar in numbering, the numbering is only for the purpose of explanation in the instant embodiment. The analysis device 11 cannot determine the association between the first application 101 and the second application 102, 103 . . . 10m, and cannot identify if information M101, M102 . . . M10m correspond to the same mobile device T1 before the information feature are compared.

In FIG. 2, the first application 101 and the second application 102, 103 . . . 10m are installed in the mobile device T1, whereas the second application 201, 202, 203 . . . 20n are installed in the mobile device T2. The processing unit 112 compares the degree of similarity between the first information feature and the second information feature I102, I103 . . . I10m, I201, I202, I203 . . . I20n, in order to generate a first comparison result. The processing unit 12 determines whether the mobile device (T1) that corresponds to the first information feature I101 is the same mobile device as the mobile device (T1/T2) that corresponds to the second information feature I102, I103 . . . I10m, I201, I202, I203 . . . I20n according to the first comparison result (in other words, determines whether the first application 101 and the second application 102, 103 . . . 10m, 201, 202, 203 . . . 20n are installed on the same mobile device according to the information feature). In terms of the degree of similarity between each information feature associated with the application, the information feature (I101, I102, I103 . . . I10m) associated with the applications (101, 102, 103 . . . 10m) installed on the mobile device T1 are supposed to be similar to one another, and the information feature (I101, I102, I103 . . . I10m) associated with the applications (101, 102, 103 . . . 10m) that are installed on the mobile device T1 are likely to differ from the information feature (I201, I202, I203 . . . I20n) associated with the applications (201, 202, 203 . . . 20n) that are installed on the mobile device T2. In other words, the comparison result obtained by comparing degree of similarity allow the analysis device 11 to determine that the first application 101 and second applications 102, 103 . . . 10m are installed in the same mobile device T1, and the second applications 201, 202, 203 . . . 20n are installed in the same mobile device T2.

If the mobile device that corresponds to the first information feature I101 and the mobile device that corresponds to the second information feature (such as I102, I103 . . . I10m) are the same mobile device, then the identification information (such as M102, M103 . . . M10m) of the mobile device corresponding to the second information feature (such as I102, I103 . . . I10m) that is stored in the features database 111 is replaced by the identification information M101 of the mobile device corresponding to the first information feature I101. Moreover, the identification information M101, M102, M103 . . . M10m can be treated as corresponding to the same mobile device after processing. Similarly, the analysis device 11, according to comparison results, can replace the identification information M202, M203 . . . M20n of the mobile device corresponding to the second information feature I202, I203 . . . I20n by the identification information M201 of the mobile device corresponding to the second information feature I201, or, the identification information M201, M202, M203 . . . M10n can be treated as the same.

In terms of comparison and calculations for the degree of similarity between information feature based on species of mobile application information, there can be various ways to do so, such as select the species of information that are the most important after categorizing the mobile application information into their respective species, or, separately select the important information from a certain species to analyze (calculations) the information feature. In some embodiments, there can be many types of information feature associated with a mobile device application, such as brand, model, operating system, screen resolution, network address (IP address), network connection type, application identification code (app ID), app list, geographical location (such as GPS position), the frequency of key stroked, stoke coordinates, gesture trajectory, time periods, and other characteristics. There may be different types of mobile application information, for example, each mobile device may have a corresponding brand, model, operating system, screen resolution, which is classified as device information. The network address and network connection types that are used when a user execute an application are different, and can be classified as network information. Each application has an application identification code, and according to the status of the application installed on the mobile device, the application list of each mobile device is not the same and can be classified as application information. Moreover, the geographical location of each mobile device used can be different, which is classified as position information of the mobile device. The frequency of key stroked, stoke coordinates, gesture trajectory, and time periods can be classified as user behavior information. Among all the information feature mentioned above, certain features are considered to be major features. The major features can be the IP address or app list of the mobile device at a certain specific time period. In an embodiment, the major features can be first determined by the system or one of the many mobile application information can be defined as a major feature by a system administrator, whereas at least one of the mobile application information that is not defined as a major feature can be selected as a minor feature. The major and minor features that are set will be used for degree of similarity comparison and calculations. In another embodiment, besides defining the major and minor features, a species or many species of mobile application information can be further selected for calculations as the major and minor features according to the categorization results of the mobile application information. Notably, categorizing the mobile application information is only for the purpose of clarification on the properties of the features, when comparing features, the mobile application information is not necessarily categorized based on the selected major and minor features. The first information feature I101 can include the first major feature and the first minor feature. The second information features I102, I103 ... I10m, I201, I202, I203 ... I20n include the second major features and the second minor features. In the instant embodiment, the major feature can be a feature that allow the analysis device to effectively determine the degree of similarity between information feature of the applications, however, the criteria to determine the degree of similarity between information feature are not limited to selected major features, minor features can also be the criteria.

The IP address of the same mobile device in the preset time period is the same during operation, the application list associated with each application in the same time period is likely to be the same or very similar in the same mobile device (unless user installs or removes a large volume of applications within a short period of time), and the degree of similarity between application lists on different mobile devices should be somewhat different. Thus, in one embodiment, the first major feature can be the first application list of the mobile device corresponding to the first information feature I101, and the second major feature can be the second application list of the mobile device corresponding to the second information feature I102, I103 ... I10m, I201, I202, I203 ... I20n. In another embodiment, the first major feature can be a first IP address in a preset time period of the mobile device corresponding to the first information feature I101 and the second major feature can be a second IP address in the preset time period of the mobile device corresponding to the second information feature I102, I103 ... I10m, I201, I202, I203 ... I20n.

Furthermore, the first minor feature can be a single or a combination of multiple types of information in the mobile device that corresponds to the first information feature I101, such as device information, position information, network information, or user behavior information, whereas the second minor feature can be a single or a combination of multiple types of information in the mobile device that corresponds to the second information feature I102, I1 ... I10m, I201, I202, I203 ... I20n, such as device information, position information, network information, or user behavior information, but is not limited to the examples provided herein.

Figure 4:
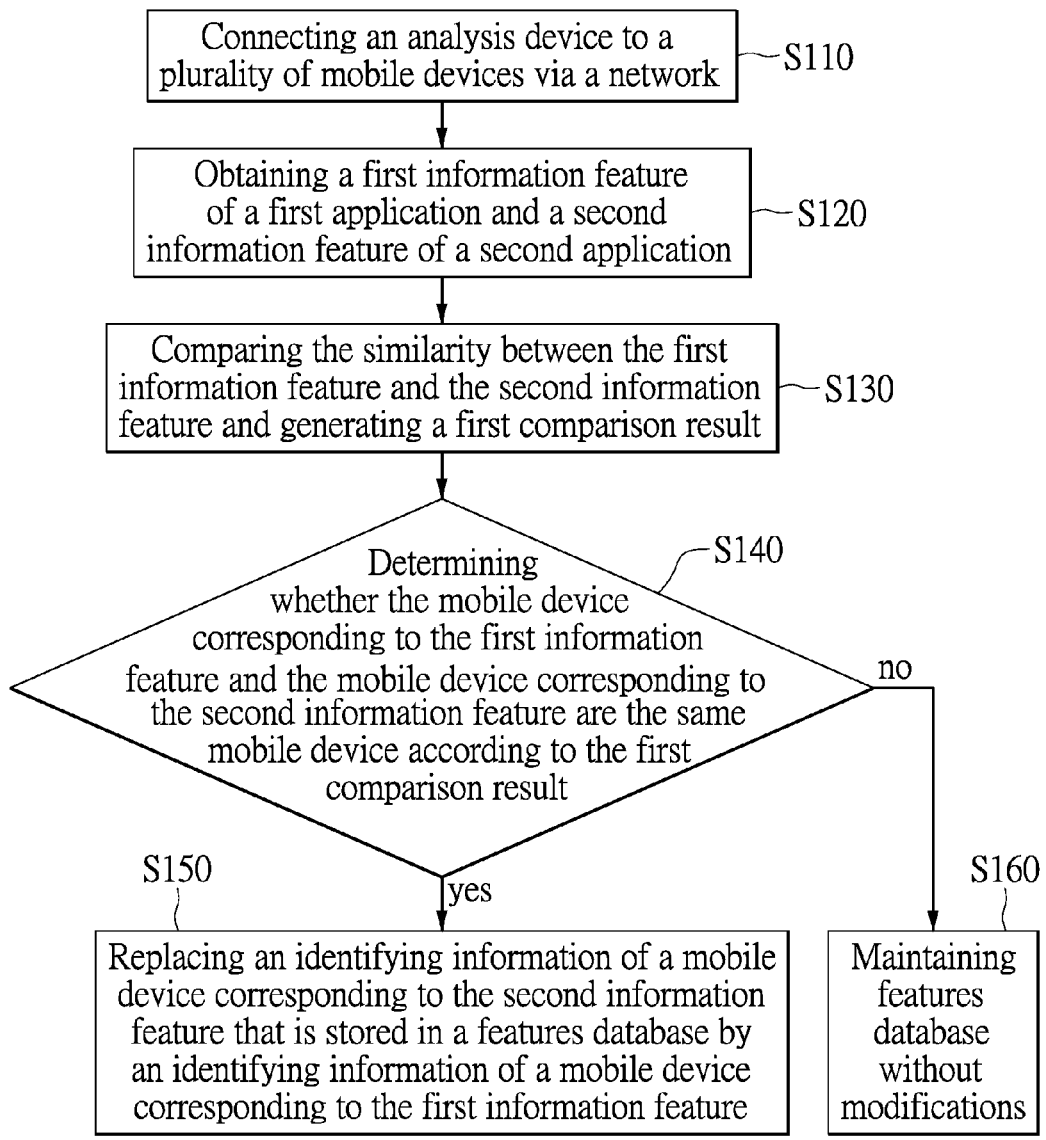
FIG. 4 is a process flow diagram illustrating the method for identifying mobile devices based on information feature of applications in accordance with an embodiment of the instant disclosure.

Please refer to FIGS. 1 and 4. FIG. 4 is a process diagram illustrating the method for identifying mobile devices based on information feature of applications in accordance with an embodiment of the instant disclosure. In step S110, connect the analysis device 11 to a plurality of mobile devices T1, T2 ... TN via a network 12. The analysis device 11 has a features database 111. As shown in the schematic diagram of the applications in FIG. 2, the features database 111 stores the first information feature I101 (associated with a first application 101) along with the identification information M101 of the corresponding mobile device and the second information feature I102, I103 ... I10m, I201, I202, I203 ... I20n (associated with a second applications 102, 103 ... 10m, 201, 202, 203, 20n) along with the identification information M102, M102 ... M10m, M201, M202, M203 ... M20n of the corresponding mobile device.

Subsequently in step S120, obtain the first information feature I101 that associates with the first application 101 and second information feature I102, I103 ... 10m, I201, I202, I203 ... I20n that associate with the second application 102, 103 ... 10m, 201, 202, 203 ... 20n from the analysis device 11. The first information feature I101 corresponds to one of the mobile devices (mobile device T1 in FIG. 2), and the second information feature I102, I103 ... I10m, I201, I202, I203 ... I20n corresponds to one of the mobile devices (mobile device T1 or T2 in FIG. 2). The analysis device 11 can actively request the application to transmit information feature to the analysis device 11 or actively transmit information feature when the application is executed.

Notably, there are various aspects of the embodiment based on the way in which the information feature is obtained by the analysis device 11. In another embodiment, after the step S110 and before the step S120, the first information feature is obtained in the first mobile device and the second information feature is obtained in the second mobile device. Then the first mobile application information associated with the first application is collected in the first mobile device, and the second mobile application information associated with the second application is collected in the second mobile device. As a result, the information feature (the first information feature and the second information feature) can be actively collected and processed by the mobile device and then transmitted to the analysis device 11. Similarly in another embodiment, the application can transmit the mobile application information to the analysis device 11, and the analysis device 11 can process the first and second mobile application information obtained therein and respectively obtain the first and second information feature, so that the mobile application information is not required to be processed by the mobile device.

Moreover, execute step S130 in the analysis device 11. Comparing the degree of similarity between the first information feature and the second information feature I102, I103 ... I10m, I201, I202, I203 ... I20n in order to generate a first comparison result.

Then, execute the step S140 in the analysis device 11. Determine whether the mobile device T1 corresponding to the first information feature I101 and the mobile device T1 or T2 corresponding to the second information feature I102, I103 ... I10m, I201, I202, I203 ... I20n are the same device according to the first comparison result. If the result is true (the same device), step S150 is executed by replacing the identifying information of a mobile device corresponding to the second information feature that is stored in a features database 111 by the identifying information M101 of a mobile device corresponding to the first information feature I101. For example: if the first information feature I101 associated with the first application 101 is similar to the second information feature I102, I103 ... I10m associated with the second application 102, 103 ... 10m, the identifying information M102, M103 ... M10m of the mobile device that corresponds to the second application 102, 103 ... 10m and is stored in the features database 111 can be replaced with the identifying information M101 of the mobile device that corresponds to the first application 101. If the result is false (not the same device), step S160 is executed by not modifying the features database 111. For example, when the first information feature I101 associated with the first application 101 is not similar to the second information feature I201, I202, I203 ... I20n associated with the second application 201,202, 203 ... 20n, the features database 111 is not modified. The information features that associate with the application may change with respect to time, and the steps as described above can be executed repeatedly.

Figure 5:
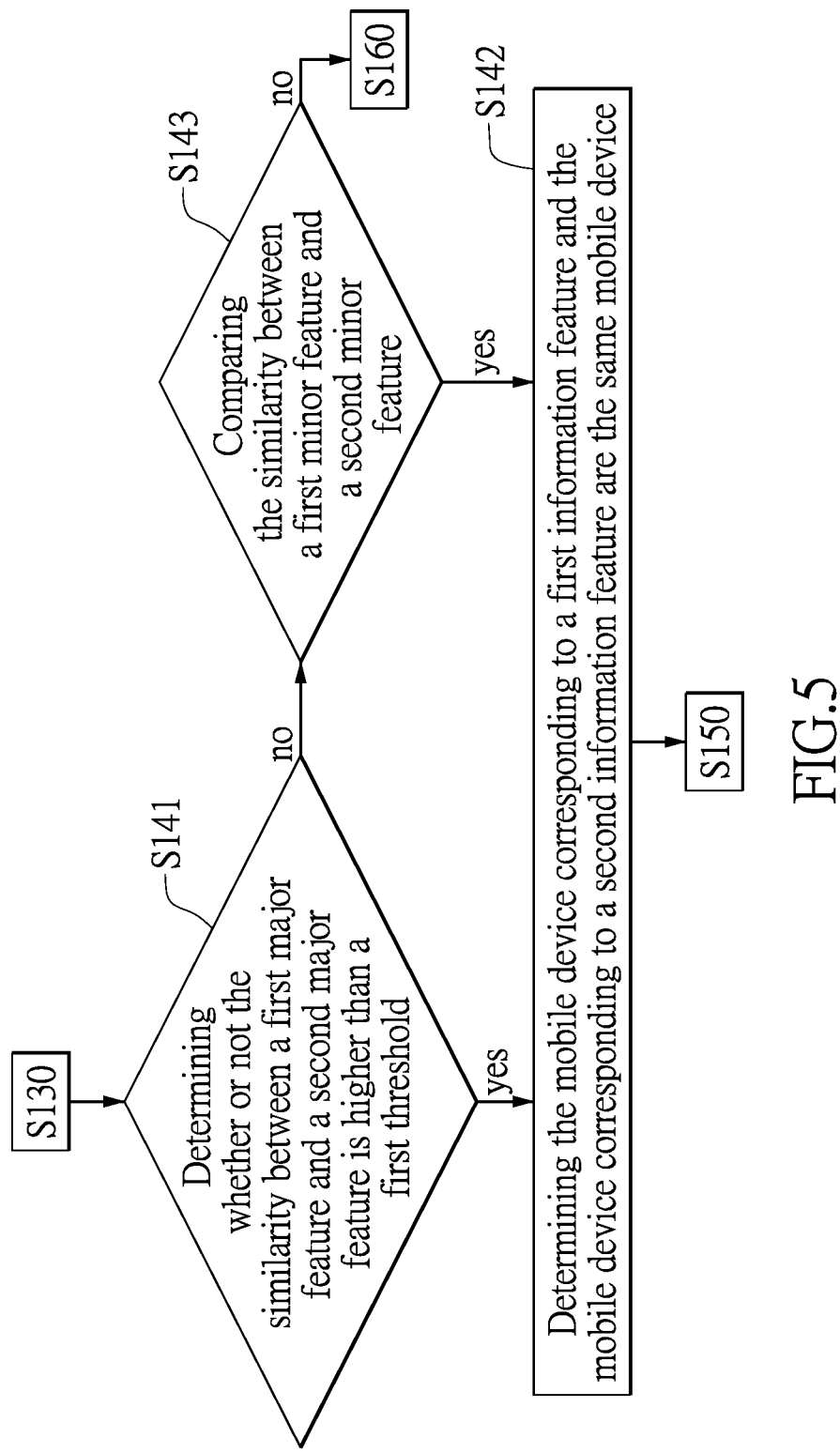
FIG. 5 is a sub-process flow diagram of the step S140 in accordance with an embodiment of the instant disclosure.

In one embodiment, step S140 in FIG. 4 is implemented in the sub-process flow diagram in FIG. 5. Step S141 in FIG. 5 compares whether the degree of similarity between the first major feature and the second major feature exceeds a first threshold value. In one embodiment, application lists can be compared for degree of similarity, for example: names, quantity, or order of applications in application lists can be compared to determine whether the degree of similarity between more than 90% is achieved. In another embodiment, network (IP) addresses at specific time periods can be compared for a match, but the instant disclosure is not limited hereto.

When the degree of similarity between the first major feature and the second major feature exceeds the first threshold value, step 142 is executed, in which the mobile device corresponding to the first information feature I101 and the mobile device corresponding to the second information feature are analysis and determined whether or not both mobile devices are actually the same mobile device. When the degree of similarity between the first major feature and the second major feature has not yet exceeded the first threshold value, step S143 is executed, in which the degree of similarity between the first minor feature and the second minor feature is compared. For example: device information, position information, network connection type or user behavior information of the mobile device can be compared. A second threshold value of the degree of similarity between the first and second minor features, for example, can be defined as the degree of similarity between device information, proximity between position information (or within a set range), degree of similarity between network connection types, or degree of similarity between user behavior information. When the degree of similarity between the first and second minor features exceeds the second threshold value, step 142 is executed, in which the mobile device corresponding to the first minor feature I101 and the mobile device corresponding to the second minor feature are analysis and determined whether or not both devices are actually the same device.

Figure 6:
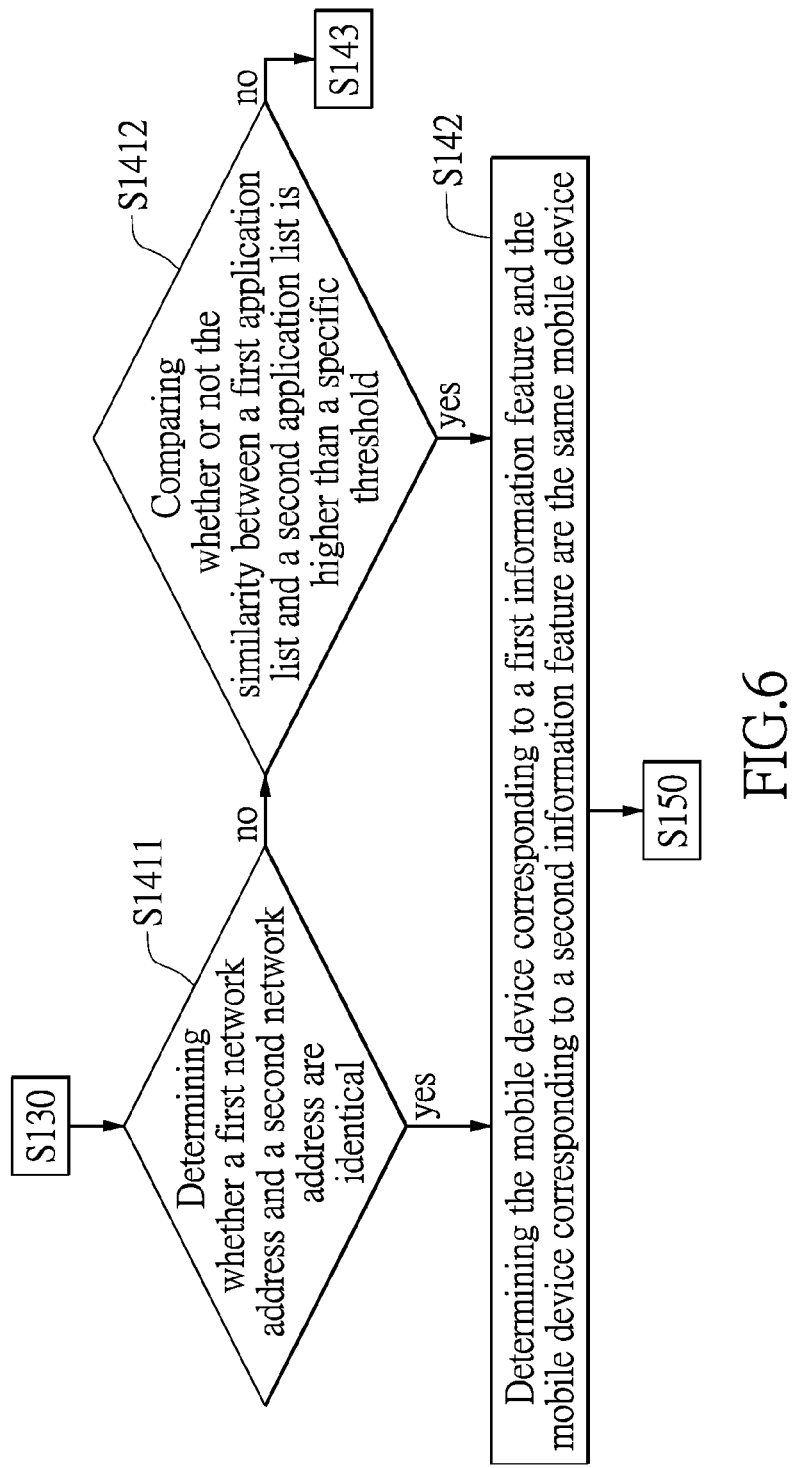
FIG. 6 is a sub-process flow diagram of the step S141 in accordance with an embodiment of the instant disclosure.

In one embodiment, major features comparison of step S141 as shown in FIG. 5 can be implemented in the sub-process flow diagram of FIG. 6. The first information feature includes the first network address of the mobile device corresponding to a specific time period and a first application list, the second information feature includes the second address of the mobile device corresponding to a specific time period and a second application list. The analysis device 11 first analyze whether the network addresses of the mobile devices corresponding to the respective time periods are the same, then the application lists are analyzed to determine degree of similarity. Step S1411 as shown in FIG. 6 determines whether the first network address and the second network address are the same. When the first and second network addresses are the same, step 142 is executed, in which the mobile device corresponding to the first information feature and the mobile device corresponding to the second information feature are determined to be the same mobile device. When the first and second network addresses are not the same, execute step S1412, in which the degree of similarity between the first and second application lists is compared to determine whether or not the degree of similarity exceeds a specific threshold. When the degree of similarity exceeds the specific threshold, step S142 is executed, and when the degree of similarity does not exceed the specific threshold, step S143 is executed as shown in FIG. 5. In step 142, the mobile device corresponding to the first information feature and the mobile device corresponding to the second information feature are determined to be the same mobile device.

In summary, the method and system for identifying mobile devices based on information features of applications in accordance with the embodiments of the instant disclosure can anonymously track users by analyzing the information features associated with the applications without the need to acquire user's personal information. The method and system of the instant disclosure can replace the conventional method to identify user, collect and analyze the user behavior on the application, and accurately identify whether various applications are already installed on the same mobile device under the circumstances where user information is not acquirable. In terms of mobile advertising, the method and system can be integrated into the mobile advertising performance analysis system (or platform) to help those who like to track performances of the advertisements on users' mobile devices.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A method for identifying mobile devices according to features of each application of mobile devices:

connecting an analysis device with a plurality of mobile devices via a network, wherein the analysis device has a features database, the features database stores a first information feature with the identifying information from the corresponding mobile device and a second information feature with the identifying information of the corresponding mobile device;

obtaining the first information feature related to a first application and the second information feature related to a second application by the analysis device, wherein the first information feature corresponds to one of the mobile devices, the second information feature corresponds to one of the mobile devices;

comparing the degree of similarity between the first information feature and the second information feature by the analysis device, so as to generate a first comparison result; and determining whether the mobile device corresponding to the first information feature and the mobile device corresponding to the second information feature are the same mobile device by the analysis device according to the first comparison result, and if yes, replacing the identifying information of the mobile device corresponding to the second information feature stored in the features database by the identifying information of the mobile device corresponding to the first information feature.

2. The method according to claim 1, wherein the first information feature comprises a first major feature and a first minor feature, and the second information feature comprises a second major feature and a second minor feature, wherein the step of determining whether the mobile device corresponding to the first information feature and the mobile device corresponding to the second information feature are the same mobile device by the analysis device according to the first comparison result comprises:

comparing the degree of similarity between the first major feature and the second major feature; wherein when the degree of similarity between the first major feature and the second major feature is higher than a first threshold, the mobile device corresponding to the first information feature and the mobile device corresponding to the second information feature are determined to be the same mobile device; and comparing the degree of similarity between the first minor feature and the second minor feature when the degree of similarity between the first major feature and the second major feature is not higher than the first threshold; wherein when the degree of similarity between the first minor feature and the second minor feature is higher than a second threshold, the mobile device corresponding to the first information feature and the mobile device corresponding to the second information feature are determined to be the same mobile device.

3. The method according to claim 2, wherein the first minor feature is the device information, position information, network connection type, or the user behavior information of the mobile device corresponding to the first information feature, and the second minor feature is the device information, position information, network connection type, or the user behavior information of the mobile device corresponding to the second information feature.

4. The method according to claim 2, wherein the first major feature is a first application list of the mobile device corresponding to the first information feature, and the second major feature is a second application list of the mobile device corresponding to the second information feature.

5. The method according to claim 2, wherein the first major feature is a first network IP address of the mobile device corresponding to the first information feature, and the second major feature is a second network IP address of the mobile device corresponding to the second information feature.

6. The method according to claim 1, wherein the first information feature comprises a first network IP address corresponding to a specific time period and a first application list of the mobile device corresponding to the first information feature, the second information feature comprises a second network IP address corresponding to the specific time period and a second application list of the mobile device corresponding to the second information feature, and wherein the step of determining whether the mobile device corresponding to the first information feature and the mobile device corresponding to the second information feature are the same mobile device comprises:
determining whether the first network IP address and the second network IP address are the same, wherein when the first network IP address and the second network IP address are the same, the mobile device corresponding to the first information feature and the mobile device corresponding to the second information feature are determined to be the same mobile device; and
comparing the degree of similarity between the first application list and the second application list when the first network IP address and the second network IP address are not the same, and when the degree of similarity is higher than a specific threshold, determining the corresponding mobile device of the first information feature and the corresponding mobile device of the second information feature to be the same mobile device.

7. The method according to claim 1, further comprising:
collecting a first mobile application information related to the first application in a first mobile device; and
collecting a second mobile application information related to the second application in a second mobile device.

8. The method according to claim 1, wherein the information feature and the second information feature are predefined in the features database.

9. A system for identifying mobile devices according to features of each application of mobile devices, the system comprising an analysis device, the analysis device connecting to a plurality of mobile devices via a network, the analysis device comprising:
a receiving unit, obtaining a first information feature related to a first application and a second information feature related to a second application, and wherein the first information feature corresponds to one of the mobile devices, the second information feature corresponds to one of the mobile devices;
a features database, storing the first information feature with an identifying information from the corresponding mobile device and the second information feature with an identifying information of the corresponding mobile device; and
a processing unit, comparing the degree of similarity between the first information feature and the second information feature, so as to generate a first comparison result, and determining whether the mobile device with the corresponding first information feature and the mobile device with the corresponding second information feature are the same mobile device according to the first comparison result, and if yes, replacing the identifying information of the mobile device corresponding to the second information feature stored in the features database by the identifying information of the mobile device corresponding to the first information feature.

10. The system according to claim 9, wherein the first information feature comprises a first major feature and a first minor feature, the second information feature comprises a second major feature and a second minor feature; wherein when the processing unit comparing the degree of similarity between the first information feature and the second information feature, the processing unit first compares the degree of similarity between the first major feature and the second major feature, wherein when the degree of similarity is higher than a first threshold, the mobile device corresponding to the first information feature and the mobile device corresponding to the second information feature are determined to be the same mobile device, the processing unit compares the degree of similarity between the first minor feature and the second minor feature when the degree of similarity is not higher than the first threshold, and wherein when the degree of similarity between the first minor feature and the second minor feature is higher than a second threshold, the mobile device corresponding to the first information feature and the mobile device corresponding to the second information feature are determined to be the same mobile device.

11. The system according to claim 10, wherein the first minor feature is the device information, position information, network connection type, or the user behavior information of the mobile device corresponding to the first information feature, and the second minor feature is the device information, position information, network connection type, or the user behavior information of the mobile device corresponding to the second information feature.

12. The system according to claim 10, wherein the first major feature is a first application list of the mobile device corresponding to the first information feature, and the second major feature is a second application list of the mobile device corresponding to the second information feature.

13. The system according to claim 10, wherein the first major feature is a first network IP address of the mobile device corresponding to the first information feature, and the second major feature is a second network IP address of the mobile device corresponding to the second information feature.

14. The system according to claim 9, wherein the first information feature comprises a first network IP address corresponding to a specific time period and a first application list of the mobile device corresponding to the first information feature, the second information feature comprises a second network IP address corresponding to the specific time period and a second application list of the mobile device corresponding to the second information feature;

wherein when the processing unit compares the degree of similarity between the first information feature and the second information feature, the processing unit first determines whether the first network IP address and the second network IP address are the same, and if yes, the mobile device corresponding to the first information feature and the mobile device corresponding to the second information feature are determined to be the same mobile device, and if not, the processing unit compares the degree of similarity between the first application list and the second application list, and when the degree of similarity is determined to be higher than a specific threshold, the corresponding mobile device of the first information feature and the corresponding mobile device of the second information feature are determined to be the same mobile device.

15. The system according to claim 9, wherein a first mobile device collects a first mobile application information related to the first application, and a second mobile device collects a second mobile application information related to the second application.

16. The system according to claim 9, wherein the information feature and the second information feature are predefined in the features database.

* * * * *